(12) United States Patent
Dow et al.

(10) Patent No.: US 9,886,423 B2
(45) Date of Patent: Feb. 6, 2018

(54) RECONCILIATION OF TRANSCRIPTS

(71) Applicant: International Business Machines Corporation, Armonk, NY (US)

(72) Inventors: Eli M. Dow, Wappingers Falls, NY (US); James P. Gilchrist, Norwalk, CT (US); Steven K. Schmidt, Hinesburg, VT (US); Charles J. Stocker, IV, Lawrenceville, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/744,218

(22) Filed: Jun. 19, 2015

(65) Prior Publication Data

US 2016/0371234 A1 Dec. 22, 2016

(51) Int. Cl.
| | |
|---|---|
| *G10L 15/00* | (2013.01) |
| *G10L 15/26* | (2006.01) |
| *G06F 17/22* | (2006.01) |
| *G10L 15/01* | (2013.01) |
| *G10L 15/22* | (2006.01) |
| *G06F 17/30* | (2006.01) |

(52) U.S. Cl.
CPC .... *G06F 17/2211* (2013.01); *G06F 17/30746* (2013.01); *G10L 15/01* (2013.01); *G10L 15/22* (2013.01); *G10L 15/26* (2013.01); *G10L 2015/226* (2013.01)

(58) Field of Classification Search
None
See application file for complete search history.

(56) References Cited

U.S. PATENT DOCUMENTS

| | | | |
|---|---|---|---|
| 6,885,989 B2 | 4/2005 | McLean et al. | |
| 7,228,275 B1* | 6/2007 | Endo | G10L 15/32 |
| | | | 704/231 |
| 7,792,675 B2 | 9/2010 | Ramaswamy et al. | |
| 7,877,518 B2 | 1/2011 | Liu | |
| 8,041,565 B1* | 10/2011 | Bhardwaj | G10L 15/28 |
| | | | 704/235 |
| 8,239,197 B2 | 8/2012 | Webb et al. | |

(Continued)

FOREIGN PATENT DOCUMENTS

WO 2014123898 A1 8/2014

OTHER PUBLICATIONS

List of IBM Patents or Patent Applications Treated as Related, Appendix P, Filed Herewith.

(Continued)

*Primary Examiner* — Marcus T Riley
(74) *Attorney, Agent, or Firm* — Christopher McLane; Daniel R. Simek

(57) ABSTRACT

The method includes identifying a plurality of transcripts of an audio event. The method further identifying a difference between two or more of the plurality of transcripts of the audio event. The method further includes determining a confidence level for the two or more transcripts that include the identified difference, wherein the confidence level indicates a measure of quality of the transcript. The method further includes selecting a difference from the two or more transcripts that include the identified difference based on the determined confidence level. The method further includes generating a transcript based on the selected difference.

12 Claims, 3 Drawing Sheets

(56) References Cited

U.S. PATENT DOCUMENTS

| | | | |
|---|---|---|---|
| 8,364,137 B2 | 1/2013 | Chen et al. | |
| 8,370,142 B2 | 2/2013 | Frankel et al. | |
| 8,447,604 B1* | 5/2013 | Chang | H04N 9/475 434/185 |
| 8,463,884 B2 | 6/2013 | Clinton et al. | |
| 8,645,134 B1* | 2/2014 | Harrenstien | G10L 15/26 704/235 |
| 8,706,102 B2 | 4/2014 | Chen et al. | |
| 8,751,743 B2 | 6/2014 | Burge, III | |
| 8,826,354 B2* | 9/2014 | Pham | G10L 15/26 348/466 |
| 8,868,409 B1* | 10/2014 | Mengibar | G10L 15/26 704/10 |
| 8,868,420 B1 | 10/2014 | Terrell, II et al. | |
| 9,245,278 B2* | 1/2016 | Orsini | G06F 17/2854 |
| 2004/0064317 A1* | 4/2004 | Othmer | G06Q 10/10 704/260 |
| 2007/0198269 A1 | 8/2007 | Braho et al. | |
| 2008/0130639 A1 | 6/2008 | Costa-Requena et al. | |
| 2008/0221881 A1* | 9/2008 | Carraux | G10L 15/22 704/235 |
| 2010/0063815 A1 | 3/2010 | Cloran et al. | |
| 2010/0251230 A1 | 9/2010 | O'Farrell et al. | |
| 2011/0112832 A1 | 5/2011 | Prorock et al. | |
| 2012/0215539 A1* | 8/2012 | Juneja | G10L 15/30 704/254 |
| 2012/0324324 A1* | 12/2012 | Hwang | G09B 5/06 715/203 |
| 2013/0058471 A1 | 3/2013 | Garcia | |
| 2013/0110509 A1 | 5/2013 | Cath et al. | |
| 2013/0219381 A1 | 8/2013 | Lovitt | |
| 2013/0297291 A1* | 11/2013 | Bostick | G10L 15/01 704/9 |
| 2014/0039871 A1* | 2/2014 | Crawford | G06F 17/211 704/2 |
| 2014/0303974 A1* | 10/2014 | Ashikawa | G10L 15/26 704/235 |
| 2015/0106091 A1* | 4/2015 | Wetjen | G10L 15/26 704/235 |
| 2015/0199966 A1* | 7/2015 | Paulik | G10L 15/26 704/235 |
| 2016/0063998 A1 | 3/2016 | Krishnamoorthy et al. | |
| 2016/0180840 A1* | 6/2016 | Siddiq | G10L 15/1815 704/257 |
| 2016/0371234 A1* | 12/2016 | Dow | G06F 17/2211 |
| 2016/0372107 A1* | 12/2016 | Dow | G06F 17/2211 |
| 2017/0201613 A1* | 7/2017 | Engelke | H04M 1/7255 |

OTHER PUBLICATIONS

Dow, et al., "Reconciliation of Transcripts", U.S. Appl. No. 14/847,072, filed Sep. 8, 2015.

Audhkhasi et al., "Reliability-Weighted Acoustic Model Adaptation Using Crowd Sourced Transcriptions," Interspeech 2011, Florence, Aug. 28-31, 2011, pp. 3045-3048.

Ng, Kenney, "Information Fusion for Spoken Document Retrieval," 2000 IEEE International Conference on Acoustics, Speech, and Signal Processing, 2000, ICASSP'00 Proceedings, vol. 6, pp. 2405-2408.

"IBM Worklight Foundation V6.3 delivers a platform for developing and managing a rich, mobile, device-specific experience", IBM United States Software Announcement 214-368, dated Oct. 1, 2014, 11 pages, <http://www-01.ibm.com/common/ssi/cgi-bin/ssialias?infotype=an&subtype=ca&supplier=897&letternum=ENUS214-368>.

* cited by examiner

RECONCILIATION OF TRANSCRIPTS

BACKGROUND

The present invention relates generally to transcripts, and more particularly to creating a transcript based upon multiple transcripts of the same event.

Transcription software assists in the conversion of human speech into a text transcript. The primary meaning of the term, "transcription software" has changed over time with the introduction of new technologies, such as natural language speech recognition. References also depend on the purpose for the transcript. The term, "transcription software" can refer to a completely automated solution or to software which helps a human transcriber manually convert spoken audio into text transcripts. In the latter case, the term digital dictation is sometimes used.

Transcription software, as with transcription services, is often provided for business, legal, or medical purposes. Compared with audio content, a text transcript is searchable, takes up less computer memory, and can be used as an alternate method of communication, such as for closed captions.

SUMMARY

Embodiments of the present invention disclose a method, computer program product, and system for generating a transcript. In one embodiment, in accordance with the present invention, the computer-implemented method includes identifying, by one or more computer processors, a plurality of transcripts of an audio event. The method further identifying, by one or more computer processors, a difference between two or more of the plurality of transcripts of the audio event. The method further includes determining, by one or more computer processors, a confidence level for the two or more transcripts that include the identified difference, wherein the confidence level indicates a measure of quality of the transcript. The method further includes selecting, by one or more computer processors, a difference from the two or more transcripts that include the identified difference based on the determined confidence level. The method further includes generating, by one or more computer processors, a transcript based on the selected difference.

DETAILED DESCRIPTION

Embodiments of the present invention recognize that voice transcription is improving rapidly with advances in technology. Embodiments of the invention recognize that transcribing entire conversations and parsing the conversations for data is becoming realistic. Embodiments of the present invention recognize that transcriptions are not exact. Embodiments of the present invention recognize that it may be beneficial to collect multiple transcriptions of the same event and aggregate the transcriptions using individual confidence levels in order to create the most accurate possible transcription.

Implementation of embodiments of the invention may take a variety of forms, and exemplary implementation details are discussed subsequently with reference to the Figures.

Figure 1:
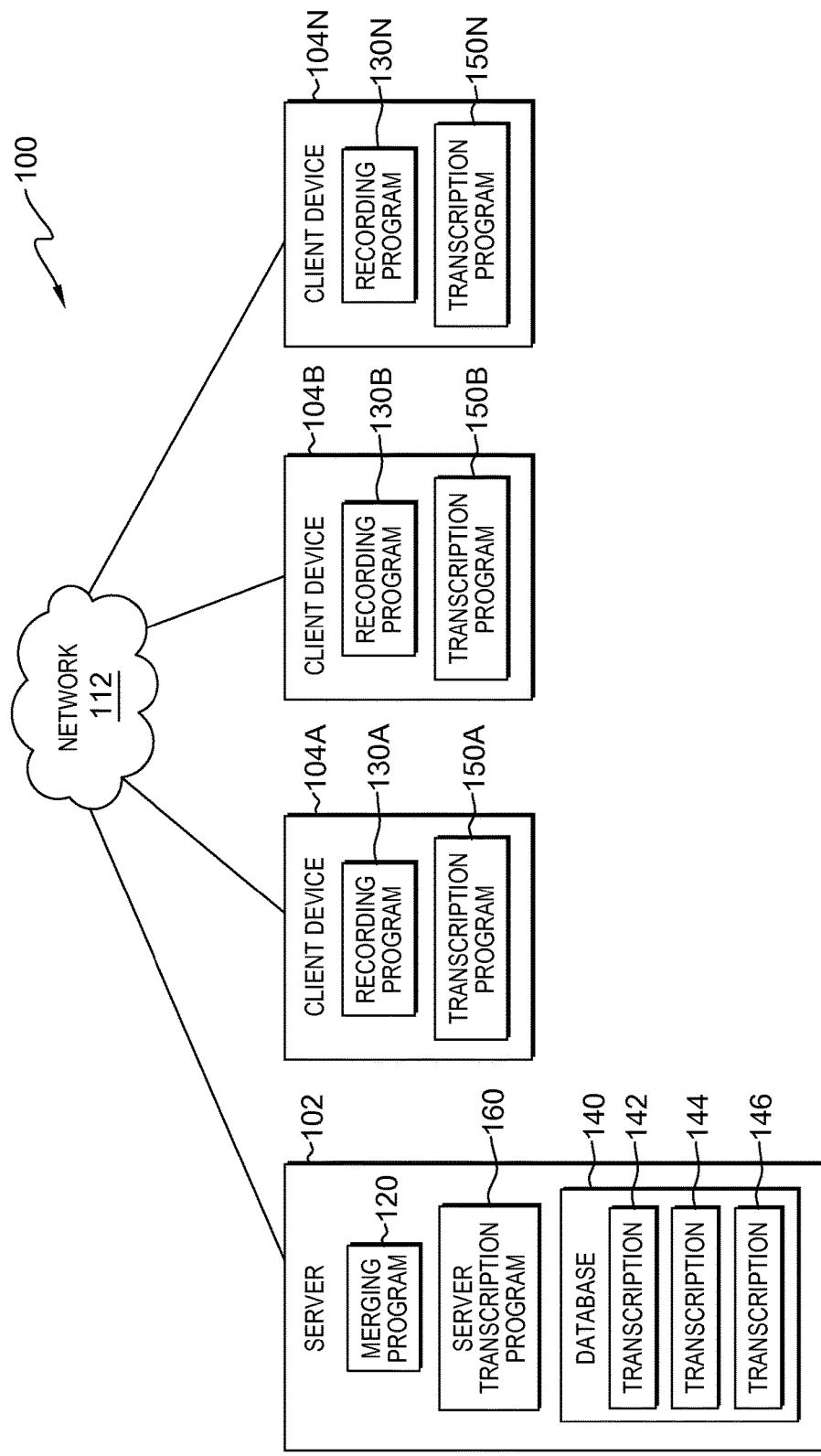
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server 102 and client devices 104A, 104B, and 104N, all interconnected over network 112. Network 112 represents, for example, a telecommunications network, a local area network (LAN), a wide area network (WAN), such as the Internet, or a combination of the three, and includes wired, wireless, and/or fiber optic connections. Network 112 includes one or more wired and/or wireless networks that are capable of receiving and transmitting data, voice, and/or video signals, including multimedia signals that include voice, data, and video information.

In the depicted environment, server 102 is one or more of a management server, a web server, or any other electronic device or computing system capable of receiving, analyzing, and sending data. In this embodiment, server 102 creates a transcript from one or more transcripts. In other embodiments, server 102 represents a server computing system utilizing multiple computers as a server system, such as in a cloud computing environment. In another embodiment, server 102 represents a laptop computer, a tablet computer, a netbook computer, a personal computer (PC), a desktop computer, a personal digital assistant (PDA), a smart phone, or any programmable electronic device capable of communicating with client devices 104A, 104B, and 104N via network 112. In another embodiment, server 102 represents a computing system utilizing clustered computers and components to act as a single pool of seamless resources. Server 102 may include components, as depicted and described in further detail with respect to FIG. 3, in accordance with embodiments of the present invention. Server 102 includes merging program 120, server transcription program 160, and database 140.

In depicted distributed data processing environment 100, merging program 120 resides on server 102 and creates a transcript from one or more transcripts. In various embodiments, merging program 120 generates confidence levels for one or more transcriptions (e.g., transcriptions 142, 144, and 146) of the same event and determines differences in the transcriptions of the same event. If merging program 120 identifies a difference in the one or more transcriptions of the same event, merging program 120 determines the transcription with the highest confidence level and utilizes the portion of the transcript that has a difference to create a master transcript from the one or more transcripts of the same event. In some embodiments, merging program 120 may reside on multiple client devices (e.g., client devices 104A, 104B, and 104N) that are connected via network 112. In these embodiments, merging program 120 may function in a peer to peer network in which multiple instances of merging program 120 are located on the multiple client devices that communicated with one another to create a master transcript. In various embodiments, merging program 120 may include a transcription program (e.g., server transcription program 160, transcription programs 150A, 150B, and 150N), a recording program (e.g., recording programs 130A, 130B, and 130N), and various other programs. In other embodiments, merging program 120 may be a subprogram of another program, such as a transcription program. Merging program 120 is depicted and described in further detail with respect to FIG. 2.

In depicted distributed data processing environment 100, sever transcription program 160 resides on server 102 and converts audio into text. In some embodiments, server transcription program 160 receives audio recording from various client devices via network 112. In various embodiments, server transcription program 160 may identify audio recordings in a database, such as database 140. In some embodiments, server transcription program 160 converts audio recording to text via methods known in the art, such as speech recognition, speech to text, etc.

In the depicted embodiment, database 140 resides on server 102. In another embodiment, database 140 may reside elsewhere in distributed data processing environment 100, such as within client devices 104A, 104B, and/or 104N or independently as a standalone database that is capable of communicating with server 102 and/or client devices 104A, 104B, and 104N via network 112. A database is an organized collection of data. Database 140 is implemented with any type of storage device capable of storing data that is accessed and utilized by server 102 and client devices 104A, 104B, and 104N, such as a database server, a hard disk drive, or a flash memory. In other embodiments, database 140 represents multiple storage devices within server 102. Database 140 stores information, such as audio recordings, transcriptions of audio recordings, confidence levels for a recording, historical confidence levels for a recording device (e.g., client devices 104A, 104B, and 104N), etc. Database 140 includes transcriptions 142, 144, and 146.

In depicted distributed data processing environment 100, transcriptions 142, 144, and 146 reside on database 140 and are transcriptions of audio recordings for the same event taken at the same time, also known as a common time period. In some embodiments, transcriptions 142, 144, and 146 were created by separate client devices, such as client devices 104A, 104B, and 104N and stored in database 140. In various embodiments, transcriptions 142, 144, and 146 are text documents created from audio recordings taken at the same time during the same event. In an example, a press conference is given in which a person is speaking into multiple microphones. Each microphone records audio and transcribes the audio into a text document which is then stored in database 140. In another example, multiple participants are on a conference call. Each telephone may record the conversation and either transcribe the audio to text or send recorded conversation to a program that can, such as server transcription program 160, which then stores the transcriptions in database 140. In some embodiments, transcriptions 142, 144, and 146 include metadata which may include historical information about a recording devices accuracy, the amount of background noise in the audio file, the confidence level of the transcription, the volume level of the recording, etc. In some embodiments, transcriptions 142, 144, and 146 may not have the same start and end times for a recording of the same event from which transcriptions 142, 144, and 146 were created; however, transcriptions 142, 144, and 146 contain at least some overlapping time of the a recording of the same event.

In the depicted embodiment, client devices 104A, 104B, and 104N are one or more of a desktop computer, a laptop computer, a tablet computer, a specialized computer server, a smart phone, or any programmable electronic device capable of communicating with server 102 via network 112 and with various components and devices within distributed data processing environment 100. In general, client devices 104A, 104B, and 104N represent any programmable electronic device or combination of programmable electronic devices capable of executing machine readable program instructions and communicating with other computing devices via a network, such as network 112. Client devices 104A, 104B, and 104N may include components, as depicted and described in further detail with respect to FIG. 3, in accordance with embodiments of the present invention. In an embodiment, client devices 104A, 104B, and 104N may record or receive an audio file. In various embodiments, client devices 104A, 104B, and 104N may include recording programs (e.g., recording programs 130A, 130B, and 130N respectively) and transcription programs (e.g., transcription programs 150A, 150B, and 150N). In some embodiments, client devices 104A, 104B, and 104N may record audio, transcribe the audio into text, and send the text to merging program 120.

In depicted distributed data processing environment 100, recording programs 130A, 130B, and 130N reside on client devices 104A, 104B, and 104N respectively and record audio via a microphone. In some embodiments, recording programs 130A, 130B, and 130N may receive an audio feed from another device via a network, such as network 112. In various embodiments, recording programs 130A, 130B, and 130N may include information in the form of metadata about the audio recording, such as background noise, the volume of the sounds in the recording, audio bit depth, sound pressure level, sampling rate, the activity of any background noise suppression techniques, if the recording was taken via transcription of a remote signal or a signal generated by an operatively coupled microphone (e.g., the local mic being transcribed, the transcription of a signal coming in over the cell network, or other calling/conferencing application audio/video stream, etc.)

In depicted distributed data processing environment 100, transcription programs 150A, 150B, and 150N reside on client devices 104A, 104B, and 104N respectively and convert audio into text. In some embodiments, transcription programs 150A, 150B, and 150N receive audio recording from various client devices via network 112 directly from a recording program (e.g., recording programs 130A, 130B, and 130N) or a live feed. In some embodiments, server transcription program 160 converts audio recording to text via methods known in the art, such as speech recognition, speech to text, etc.

Figure 2:
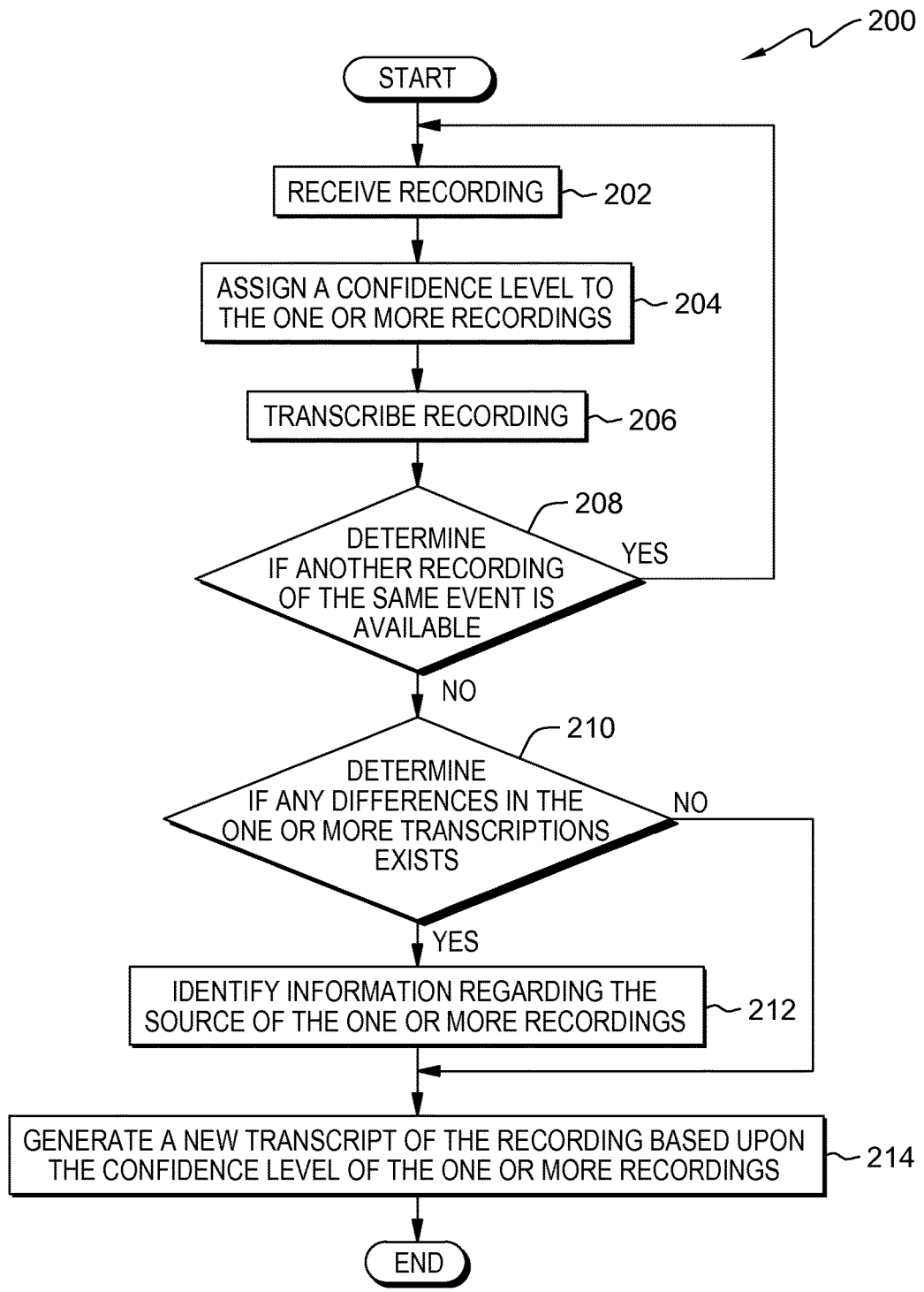
FIG. 2 is a flowchart depicting operational steps of a program for creating a transcript from one or more transcripts, within the distributed data processing environment of FIG. 1, in accordance with an embodiment of the present invention.

FIG. 2 is a flowchart depicting operational steps of program 200, which is a function of merging program 120, in accordance with an embodiment of the present invention. Program 200 operates on server 102 and creates a transcript from one or more transcripts. In various embodiments, program 200 may initiate in response to receiving transcripts of audio (e.g., transcription 142). In another embodiment, a user of merging program 120 may request a master transcript based upon one or more transcripts (e.g., transcriptions 142, 144, and 146). In an embodiment, merging program 120 may receive a notification from a client device (e.g., client devices 104A, 104B, and 104N) to begin operational steps of program 200. In one embodiment, program 200 may begin the operational steps for program 200 at preset time intervals.

Program 200 receives a recording (step 202). In various embodiments, program 200 receives a recording from a client device (e.g., client devices 104A, 104B, and 104N). In an example, client device 104A records audio and sends the audio file to program 200 via network 112. In some embodiments, program 200 may receive a live audio feed from a computing device (e.g., client devices 104A, 104B, and 104N). In one example, program 200 may directly receive an audio stream via network 112. In yet other embodiments, program 200 may identify audio files stored in a database, such as database 140. In an example, program 200 may identify audio files stored in database 140, stored on a removable disk, stored on a flash drive, etc. In this example, a user of program 200 may indicate which audio files to identify via a user interface (not depicted).

Program 200 assigns a confidence level to the one or more recordings (step 204). In some embodiments, program 200, or the program that initially recorded the audio, may create a confidence level for the recording based upon criteria including signal strength, volume, voice pattern recognition, white noise detection, etc. In some embodiments, a confidence level may be created for the entire recording or portions of the recording. In an example, a recording is very clear, with a good volume level, except for a ten-second portion with high background noise. Program 200 may assign the entire recording a 98 out of 100 for a high-quality recording. Program 200 may also assign a 20 out of 100 for the ten-second portion and a 100 out of 100 for the remainder of the recording. In some embodiments, historical accuracy of the recording and/or transcribing client device may factor into a confidence level. For example, if a client device (e.g., client device 104A) has had poor recordings in the past, program 200 may assign a recording or transcription generated by the client device a lower confidence number. In some embodiments, program 200 may receive user feedback on the final master transcript (e.g., the transcript produced in step 214), wherein users may rate the transcript for accuracy, and/or users may correct the master transcript. In these embodiments, program 200 may update confidence levels based upon the recordings and/or transcriptions generated by the client devices as compared to a previously user verified master transcript generated by program 200.

In some embodiments, program 200 may generate confidence level by utilizing generalized syllable posterior probability (GSPP) as a statistical confidence measure to verify errors in phonetic transcriptions, such as reading errors, inadequate alternatives of pronunciations in the lexicon, letter-to-sound errors in transcribing out-of-vocabulary words, idiosyncratic pronunciations, etc. In some embodiments, program 200 may utilize a combination of automatic speech recognition (ASR) confidence measure and a semantic compaction factor (compacity) index (SCI) that estimates the relevance of the words considering the semantic context in which the words occurred.

Program 200 transcribes a recording (step 206). In various embodiments, program 200 transcribes audio files into text files. In an example, program 200 converts a received audio file from step 204 into a text file, such as transcription 142, utilizing methods known in the art, such as speech recognition, speech to text, etc. In some embodiments, program 200 may not receive an audio file in step 204 but rather a transcribed version of the audio file. In an example, client device 104A includes transcription software (e.g., transcription program 150A) that transcribes the audio file prior to sending the text file to program 200. In various embodiments, program 200 may store the transcribed recording in a database, such as database 140.

In some embodiments, a text file (e.g., transcription program 150A) may be accompanied by one or more metadata files including information about the mechanism of textual representation generation. In some embodiments, metadata files may include metadata about the originating audio file recording (e.g., information about the recording device, the amount of white noise, etc.) that generated the textual representation. In various embodiments, transcriptions (e.g., transcriptions 142, 144, and 146) may also be time annotated based on a universally coordinated clock, such as coordinated universal time (UTC) or some other synchronization scheme for relative timekeeping. In some embodiments, some file formats (e.g., extensible markup language (XML)) may represent metadata and textual transcription within a single file instance for processing convenience.

Program 200 determines if another recording of the same event is available (decision 208). In some embodiments, program 200 determines if another recording for the same event as program 200 receives (in step 202) is available. In one example, a recording may include a tag or metadata that includes a title, a date, a time, a description of the event of the recording, other devices that were linked and also recording, etc. In some embodiments, an audio recording of an event may contain multiple recordings in one file. In some embodiments, program 200 determines if transcripts of an audio recording (e.g., transcriptions 142, 144, and 146), which were created from the same event, are available. In some examples, program 200 may identify the number of words in a transcript to determine if multiple transcripts are within a similarity threshold for the same number of words, such as 99%.

If program 200 determines that another recording of the same event is available (yes branch, decision 208), then program 200 returns to step 202 to receive and/or identify additional recordings or transcriptions. In another embodiment, program 200 may return to step 206 and identify and transcribe additional recordings of the same event. In yet other embodiments, program 200 received multiple transcripts of the same event and identifies the multiple text documents (e.g., transcription 142, 144, and 146) and proceeds to decision 210.

If program 200 determines that no more similar recordings of the same event are available (no branch, decision 208), then program 200 determines if any differences in the one or more transcriptions exists (decision 210). In various embodiments, program 200 determines if any differences in the one or more transcriptions (transcriptions 142, 144, and 146) of the same event (e.g., recordings taken at the same time of the same event) exist by using an exact overlay. In another embodiment, program 200 determines if any differences in the one or more transcripts exist by methods known to one skilled in the art, such as natural language processing. In an example, differences in the transcriptions of the audio may include: words, phrases, punctuation, speakers, capitalization, spacing, character recognition, etc. In one example, two transcripts may have different words or characters corresponding to the same time in the recordings and surrounded by the same words in each recording. In the example, program 200 will determine that a difference exists because a different word, letters, shapes, etc. were generated from sounds occurring at the same time, which were transcribed.

If program 200 determines that no differences in the one or more transcriptions exist (no branch, decision 210), then program 200 generates a new transcript of the recording based upon the confidence level of the one or more recordings (step 214). In an embodiment, if program 200 determines that the one or more recordings of the same event are the same, then program 200 may create a new transcript as a copy of one of the one or more transcriptions of the audio (e.g., transcription 142). In another embodiment, if program 200 determines that the one or more recordings of the same event are the same, then program 200 may copy one of the one or more recordings of the same event (e.g., transcription 142). In various embodiments, program 200 may generate a transcript based upon the transcript with the highest confidence level. In an example, if program 200 determines that no differences in the transcripts exist (decision 210), then program 200 picks the transcript with the highest confidence level to transcribe the master version of the transcript.

If program 200 determines that differences in the one or more transcriptions exists (yes branch, decision 210), then program 200 identifies information regarding the source of the one or more recordings (step 212). In various embodiments, program 200 may find multiple differences in the one or more similar recordings. In one example, program 200 identifies the first word in transcription 142 as "Hello," but transcriptions 144 and 146 both have the first word as "Hi." In this example, program 200 identifies information regarding the recordings related to transcriptions 142, 144, and 146 which include signal strength, volume, voice pattern recognition, white noise detection, etc. In the example, the information may have been previously stored in database 140 by a user of merging program 120, stored as metadata associated with the creator of the recording, or created by merging program 120. In some embodiments, transcriptions may also be associated with a corresponding confidence level. In these embodiments, the confidence levels may be created by weighing factors, such as signal strength, volume, voice pattern recognition, white noise detection, historical accuracy of the recording device, historical accuracy of the transcription device, GSPP, etc.

Program 200 generates a new transcript of the recording based upon confidence levels of the one or more recordings (step 214). In various embodiments, program 200 generates a new transcript based upon the differences in the one or more transcripts (e.g., transcriptions 142, 144, and 146) and the confidence level for the one or more transcripts. In an example in which ten transcripts were generated from ten recordings of the same event, program 200 determines that the same sentence exists in three different iterations (e.g., The dog ran fast (phrase 1 ); The dogs ran fast (phrase 2); The dogs ran (phrase 3)). In this example, phrase 1 occurs in transcripts 1-6, phrase 2 occurs in transcripts 7-9, and phrase 3 occurs in transcript 10. Program 200 creates a single transcript of the phrase based upon the confidence level assigned to each transcript and/or portion of the transcript that the phrase exists in. For example, confidence levels for each of the ten transcripts are as follows: transcript 1 has a 65% confidence level, transcript 2 has an 80% confidence level, transcript 3 has a 90% confidence level, transcript 4 has an 86% confidence level, transcript 5 has a 30% confidence level, transcript 6 has a 70% confidence level, transcript 7 has a 90% confidence level, transcript 8 has a 98% confidence level, transcript 9 has a 96% confidence level, and transcript 10 has a 90% confidence level. In this example, program 200 utilizes the phrase 2 instead of phrase 1 or phrase 3 because transcripts 7-9 had the highest associated confidence levels for at least the portion of the transcription in which a difference was present.

In multiple embodiments, program 200 may utilize a single transcript or a transcript that was compiled over a period of time. In an example, a transcript may be between two long pauses representing a sentence or question asked of a group meeting. In some embodiments, program 200 applies confidence levels to a sentence granularity or over some suitably small time duration, which may be preset by a user.

In various embodiments, program 200 may have user presets which require more than one transcript to have the same wording in order for program 200 to use the wording from the transcript. For example, a transcript has the highest confidence level; however, program 200 chooses another transcript's wording because more than one transcripts, which have the same wording even if the confidence level isn't as high, exist. In some embodiments, program 200 may display multiple versions of the wording. For example, program 200 generates a transcript based on the one or more different transcripts and displays all differences that occur in transcripts that have a confidence level over a user preset amount, such as 90%. In another embodiment, program 200 may note the wording that is different in the one or more transcripts (e.g., highlight, change the color, change the font, etc.) and include the confidence level from the transcript which was utilized.

In some embodiments, program 200 may receive user feedback based upon the generated new transcript that allows program 200 to modify confidence levels for recording device and/or transcription generators based upon the user selected feedback. In some embodiments, feedback may occur post processing or in pseudo real time as sentences are transcribed. In an example, a smart watch or mobile computing device application may output the transcription of each sentence with a simple "yes" or "no" for accepting the transcription correctness in situations where transcriptions do not generally concur. In some examples, program 200 may select a participant randomly, or a designated user may be selected to verify transcriptions. In an embodiment, if program 200 sends a generated transcript to a small coupled display (e.g., a smart watch), then a speed reading technology may be utilized.

Figure 3:
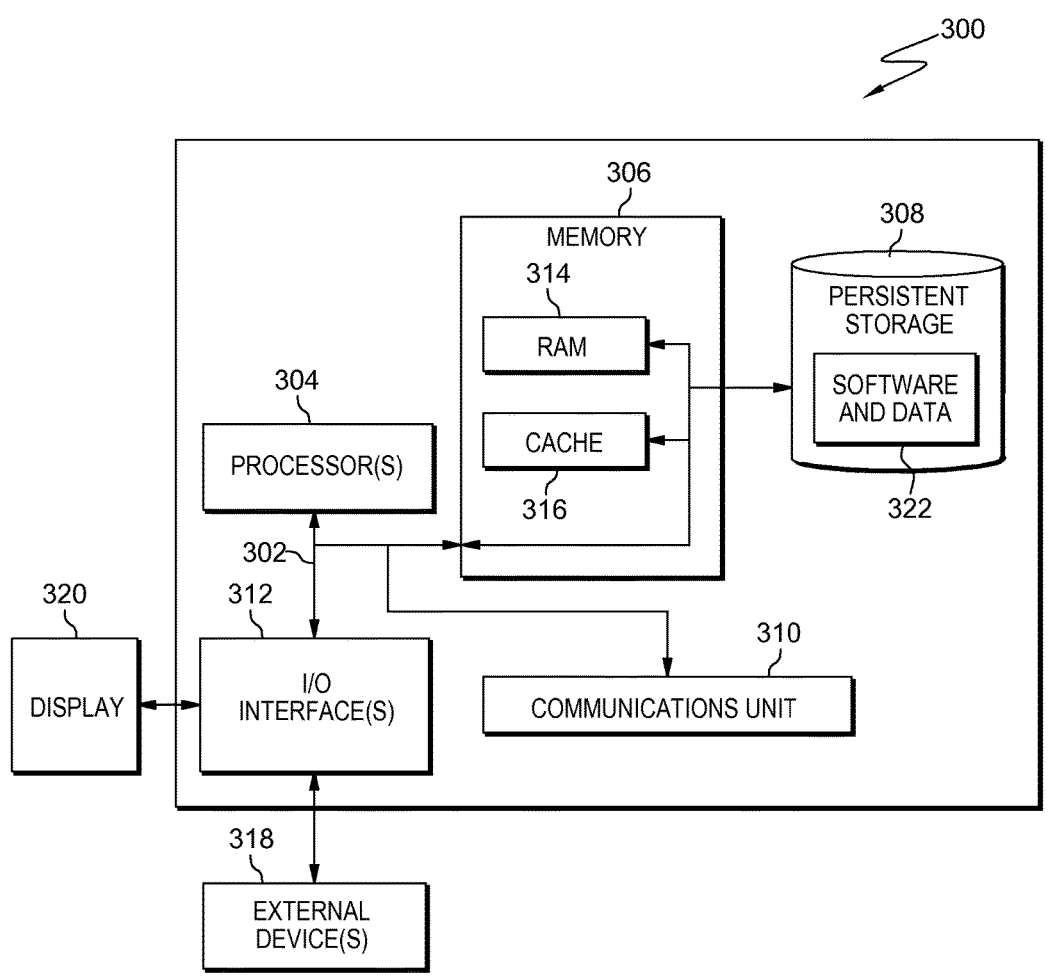
FIG. 3 depicts a block diagram of components of a client device, a server, and a source server of FIG. 1, in accordance with an embodiment of the present invention.

FIG. 3 depicts a block diagram of components of computer 300, which is representative of server 102 and client devices 104A, 104B, and 104N, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computer 300 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications, and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM) 314 and cache 316. In general, memory 306 can include any suitable volatile or non-volatile computer readable storage media. Software and data 322 are stored in persistent storage 308 for access and/or execution by processor(s) 304 via one or more memories of memory 306. With respect to server 102, software and data 322 represents merging program 120 and database 140.

In this embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Software and data 322 may be downloaded to persistent storage 308 through communications unit 310.

I/O interface(s) 312 allows for input and output of data with other devices that may be connected to computer 300. For example, I/O interface(s) 312 may provide a connection to external device(s) 318, such as a keyboard, a keypad, a touch screen, and/or some other suitable input device. External device(s) 318 can also include portable computer readable storage media, such as, for example, thumb drives, portable optical or magnetic disks, and memory cards. Software and data 322 can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for generating a transcript, the computer program product comprising:
    one or more computer readable storage media and program instructions stored on the one or more computer readable storage media, the program instructions comprising:
    program instructions to identify a plurality of transcripts from different recordings of a same audio event;
    program instructions to identify a difference between two or more of the plurality of transcripts of the audio event, wherein the difference comprises one or more different characters between the two or more of the plurality of transcripts, wherein the one or more different characters correlate to an audio portion captured at a same time during the audio event;
    program instructions to determine a confidence level for the two or more transcripts that include the identified difference, wherein the confidence level indicates a measure of quality of the transcript;
    program instructions to select a difference from the two or more plurality of transcripts that include the identified difference based on the determined confidence level; and
    program instructions to generate a transcript based on the selected difference.

2. The computer program product of claim 1, wherein a confidence level is determined based upon one or more of: signal strength, volume, voice pattern recognition, white noise detection, historical accuracy of a recording device, historical accuracy of a transcribing device, generalized syllable posterior probability, automatic speech recognition, user feedback, and semantic compaction factor index.

3. The computer program product of claim 1, wherein program instructions to determine a confidence level for the two or more plurality of transcripts that include the identified difference comprises program instructions to:
    identify a portion of a transcript from one of the two or more transcripts that includes the identified difference; and
    determine a confidence level for the identified portion of the transcript.

4. The computer program product of claim 1, wherein program instructions to select a difference from the two or more transcripts that include the identified difference based on the determined confidence level further comprises program instructions to:
    identify a portion of a first transcript from the two or more plurality of transcripts;
    identify a portion of a second transcript from the two or more plurality of transcripts, wherein the portion of the first transcript and the portion of the second transcript share a common time period of the same audio event; and
    identify a difference in characters used to transcribe the same audio event in the portion of the first transcript and characters used to transcribe the same audio event in the portion of the second transcript.

5. The computer program product of claim 1, wherein program instructions to select a difference from the two or more plurality of transcripts that include the identified difference based on the determined confidence level comprises program instructions to:
    identify a first confidence level for a portion of a first transcript from the two or more plurality of transcripts;
    identify a second confidence level for a portion of a second transcript from the two or more plurality of transcripts;
    determine whether the first confidence level is higher than the second confidence level; and
    in response to determining that the first confidence level is higher than the second confidence level, select the portion of the first transcript that includes the identified difference.

6. The computer program product of claim 1, wherein program instructions to generate a transcript based on the selected difference comprises:
    identify a first selected difference from a first portion of the two or more plurality of transcripts;

identify a second selected difference from a second portion of the two or more plurality of transcripts; and generate a transcript to incorporate the identified first selected difference and the identified second selected difference.

7. A computer system for generating a transcript, the computer system comprising:
one or more computer processors;
one or more computer readable storage media;
program instructions stored on the one or more computer readable storage media for execution by at least one of the one or more computer processors, the program instructions comprising:
program instructions to identify a plurality of transcripts from different recordings of a same audio event;
program instructions to identify a difference between two or more of the plurality of transcripts of the same audio event, wherein the difference comprises one or more different characters between the two or more of the plurality of transcripts, wherein the one or more different characters correlate to an audio portion captured at a same time during the same audio event;
program instructions to determine a confidence level for the two or more plurality of transcripts that include the identified difference, wherein the confidence level indicates a measure of quality of the transcript;
program instructions to select a difference from the two or more plurality of transcripts that include the identified difference based on the determined confidence level; and
program instructions to generate a transcript based on the selected difference.

8. The computer system of claim 7, wherein a confidence level is determined based upon one or more of: signal strength, volume, voice pattern recognition, white noise detection, historical accuracy of a recording device, historical accuracy of a transcribing device, generalized syllable posterior probability, automatic speech recognition, user feedback, and semantic compaction factor index.

9. The computer system of claim 7, wherein program instructions to determine a confidence level for the two or more plurality of transcripts that include the identified difference comprises program instructions to:
identify a portion of a transcript from one of the two or more plurality of transcripts that includes the identified difference; and
determine a confidence level for the identified portion of the transcript.

10. The computer system of claim 7, wherein program instructions to select a difference from the two or more plurality of transcripts that include the identified difference based on the determined confidence level further comprises program instructions to:
identify a portion of a first transcript from the two or more plurality of transcripts;
identify a portion of a second transcript from the two or more plurality of transcripts, wherein the portion of the first transcript and the portion of the second transcript share a common time period of the same audio event; and
identify a difference in characters used to transcribe the same audio event in the portion of the first transcript and characters used to transcribe the same audio event in the portion of the second transcript.

11. The computer system of claim 7, wherein program instructions to select a difference from the two or more plurality of transcripts that include the identified difference based on the determined confidence level comprises program instructions to:
identify a first confidence level for a portion of a first transcript from the two or more plurality of transcripts;
identify a second confidence level for a portion of a second transcript from the two or more plurality of transcripts;
determine whether the first confidence level is higher than the second confidence level; and
in response to determining that the first confidence level is higher than the second confidence level, select the portion of the first transcript that includes the identified difference.

12. A computer program product for generating a transcript, the computer program product comprising:
one or more computer readable storage media and program instructions stored on the one or more computer readable storage media, the program instructions comprising:
program instructions to identify at least a first transcript and a second transcript of an audio event, wherein the first transcript and the second transcript are generated from the same audio event;
program instructions to determine an overall confidence level for the at least the first transcript and the second transcript, wherein the overall confidence level indicates a measure of quality of the transcript;
program instructions to identify a difference in a first portion of the first transcript and a corresponding first portion of the second transcript of the same audio event, wherein the different first portions have individual confidence levels from an overall confidence level of each of the at least first transcript and the second transcript;
program instructions to identify a difference in a second portion of the first transcript and a corresponding second portion of the second transcript of the same audio event, wherein the different second portions have individual confidence levels from an overall confidence level of each of the at least first transcript and the second transcript;
program instructions to select a first portion of the first transcript, wherein the first portion of the first transcript has a highest individual confidence level for the first portion of the at least a first transcript and a second transcript of the same audio event;
program instructions to select a second portion in the second transcript, wherein the second portion of the second transcript has a highest individual confidence level for the second portion of the at least a first transcript and a second transcript of the same audio event; and
program instructions to generate a transcript to include the selected first portion of the first transcript and the selected second portion of the second transcript.

* * * * *